United States Patent [19]
Van Valkenburgh

[11] 3,984,142
[45] Oct. 5, 1976

[54] PORTABLE ENCLOSURE FOR A CYCLIST

[76] Inventor: Paul Van Valkenburgh, 5161 Anaheim, Long Beach, Calif. 90815

[22] Filed: Nov. 15, 1974

[21] Appl. No.: 524,149

[52] U.S. Cl. .................................... 296/78.1; 2/2
[51] Int. Cl.² ...................................... B62J 17/00
[58] Field of Search .............. 296/78 R, 78.1 R, 1 S; 52/2; 2/84, 87, 88, 3 R, 2, DIG. 3, 205; 9/11 A

[56] References Cited
UNITED STATES PATENTS

| | | | |
|---|---|---|---|
| 1,144,150 | 6/1915 | Marcovsky | 2/2 |
| 1,256,594 | 2/1918 | Rodal | 2/2 |
| 1,270,704 | 6/1918 | Creery | 2/88 |
| 1,802,807 | 4/1931 | Davis | 2/84 |
| 1,916,483 | 7/1933 | Krichbaum | 2/88 |
| 2,745,104 | 5/1956 | Persico et al. | 2/88 |
| 2,761,689 | 9/1956 | Becker | 296/78.1 |
| 3,086,211 | 4/1963 | Grazia | 2/3 R |
| 3,296,626 | 1/1967 | Ludwikowski | 2/87 |
| 3,323,136 | 6/1967 | Beck | 2/88 |
| 3,768,467 | 10/1973 | Jennings | 52/2 |

FOREIGN PATENTS OR APPLICATIONS

| 474,666 | 3/1915 | France | 296/78.1 |
|---|---|---|---|

*Primary Examiner*—L. J. Paperner
*Assistant Examiner*—Donald W. Underwood
*Attorney, Agent, or Firm*—Brumbaugh, Graves, Donohue & Raymond

[57] ABSTRACT

A portable enclosure for the rider of a wheeled vehicle, such as a bicycle, includes an outer skin having an aerodynamically streamlined shape and enclosing at least the torso of the cyclist. The outer skin is supported on the body of the cyclist by a plurality of inflatable cells formed by an inner skin bonded at selected points to an inner surface of the outer skin. The two skins are shaped and assembled together to define an access opening in the bottom of the enclosure through which the cyclist can insert his torso into the enclosure. An opening may also be provided near the top and front of the enclosure, through which the cyclist can project his head. Alternatively, a similarly located socket may be formed in the enclosure to receive and gimbal a rigid protective helmet worn by the cyclist and having a rounded outer surface.

7 Claims, 7 Drawing Figures

PORTABLE ENCLOSURE FOR A CYCLIST

BACKGROUND OF THE INVENTION

The bicycle, in essentially its presently known form, was first introduced in England in the late 1800's. For about the next 100 years, various improvements were made in the basic bicycle, but it remained, generally speaking, a fair-weather pleasure vehicle. Among the many improvements that have at least been suggested for bicycles are wind screens or windshields which are attached to the front of a bicycle, such as to the handlebars, so as to give the bicycle a more streamlined shape, to protect the cyclist from flying objects and, in one instance, to give the cyclist some minimal protection from the elements. Typical wind screen attachments for bicycles are illustrated in Stevens U.S. Pat. No. 695,960, Hobbs U.S. Pat. No. 2,401,245, Herbert U.S. Pat. No. 4,690,721 and Kaucher British Pat. No. 21,989. It has also been proposed to provide a more complete, streamlined enclosure for a cyclist, such as illustrated in Bunau-Varilla U.S. Pat. No. 1,135,337 and German Patentschrift No. 696,304.

Although the prior art devices of the wind-screen type afford some degree of streamlining and a modicum of additional protection for the cyclist, they tend to make a bicycle heavier, more bulky and, at least in the case of the more complete enclosures, less stable in a cross-wind. Thus, such conventional devices, while offering certain new advantages to a cyclist, at the same time diminish the existing advantages of the bicycle or motorcycle over other forms of transportation.

SUMMARY OF THE INVENTION

The present invention is directed to a portable enclosure for a cyclist which is streamlined to reduce the aerodynamic drag on a bicycle and rider, is inflatable to afford protection for a cyclist against impacts, is lightweight and is separate from a bicycle so that the bicycle is not made more bulky or heavier. A portable enclosure for the rider of a wheeled vehicle such as a bicycle, according to the invention, includes an outer skin capable of assuming an aerodynamically streamlined shape and of enclosing at least the torso of the rider. The outer skin is supported on the rider's body, rather than on the frame of the bicycle, and, in a preferred embodiment, the support is provided by a plurality of inflatable cells. The cells are formed by an inner skin bonded at selected points to the outer skin of the enclosure. Thus, the cells may be inflated to give the enclosure its streamlined shape and to afford protection for the rider. At the same time, when the cells are deflated, the enclosure occupies a minimum of space.

The inner and outer skins of the enclosure are constructed and assembled to provide an opening in the bottom of the enclosure through which a rider can insert his torso into the enclosure. A second opening can also be formed adjacent the top and front of the enclosure through which the rider can project at least the upper portion of his head. Preferably, the edges of such a head opening closely fit or are bonded to a rigid protective helmet worn by the rider. In an alternate embodiment, the inner and outer skins of the enclosure are constructed and assembled to provide a socket, adjacent the top and front of the enclosure, which receives a protective helmet having a rounded outer surface. The protective helmet can slidably rotate or gimbal in the socket to afford the rider the necessary field of vision through a viewing opening in the enclosure.

As can be seen from the foregoing description, the present invention provides the rider of a man- or motor-powered, two or three-wheeled vehicle with a lightweight, streamlined enclosure that also affords impact protection for the rider. The enclosure protects the rider from precipitation or the direct flow of cold air, but may be constructed with vents to permit a controlled air circulation through the enclosure. Since the enclosure does not have to be secured to the frame of a bicycle or motorcycle, it may be used with any two or three-wheeled vehicle without regard to its design and, when not in use, can be deflated and compressed into a volume small enough to be carried in a protective helmet, for example.

BRIEF DESCRIPTION OF THE DRAWINGS

For a better understanding of the invention, reference may be made to the following description of an exemplary embodiment, taken in conjunction with the figures of the accompanying drawings, in which.

DESCRIPTION OF AN EMBODIMENT

Figure 2:
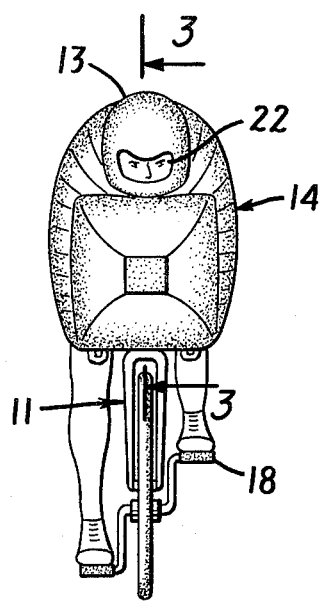
FIG. 2 is a front elevational view of the enclosure, rider, and bicycle of FIG. 1.
Figure 1:
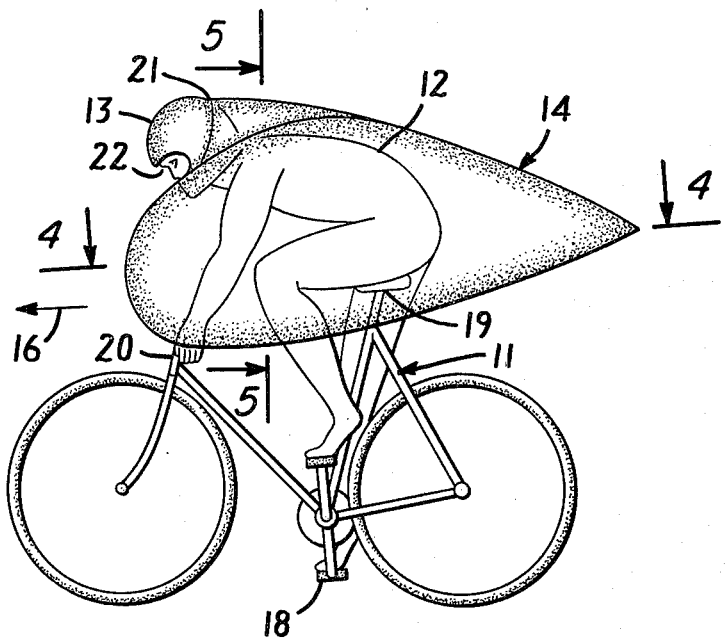
FIG. 1 is a side elevational view of an enclosure, according to the invention, in use by the rider of a typical bicycle.

FIG. 1 of the drawings illustrates a conventional bicycle 11 and a rider 12 wearing a protective helmet 13. The helmet 13 is made of conventional materials and has a rigid external shell and resilient inner liner. The shape of the helmet 13 may, however, be modified to fit together more easily with the enclosure of the present invention. Enclosing and supported by the rider 12 is a flexible plastic enclosure or bag 14 that is normally maintained in a semi-rigid state by the air pressure in inflatable air cells or chambers 15, 26 and 29. At the bottom of the bag 14 is an opening 17 that is large enough to allow entry of the rider and to permit access to the bicycle pedals 18, seat 19, and handlebars 20 when the rider is in the bag and mounted on the bicycle 11. As is illustrated, the handlebars 20 are in their lowest position, to allow the most streamlined riding position. Alternatively, they may be replaced by a simple transverse bar which has less interference with the bag 14. At the seam 21, the bag 14 is attached to the helmet 13 by removable fastener, such as tape or a water-tight zipper. The inflated shape of the bag 14 is such that aerodynamic drag in the direction indicated by the arrow 16 is at a minimum, and such that there is sufficient space within the bag to allow movement of the rider's arms and legs. As can be seen in FIG. 2, the inflated bag 14 is contoured to promote airflow around all sides, the top and the bottom of the bag. The only exposed portions of the rider 12 are his legs and his face, where exposed by the helmet opening 22.

Figure 3:
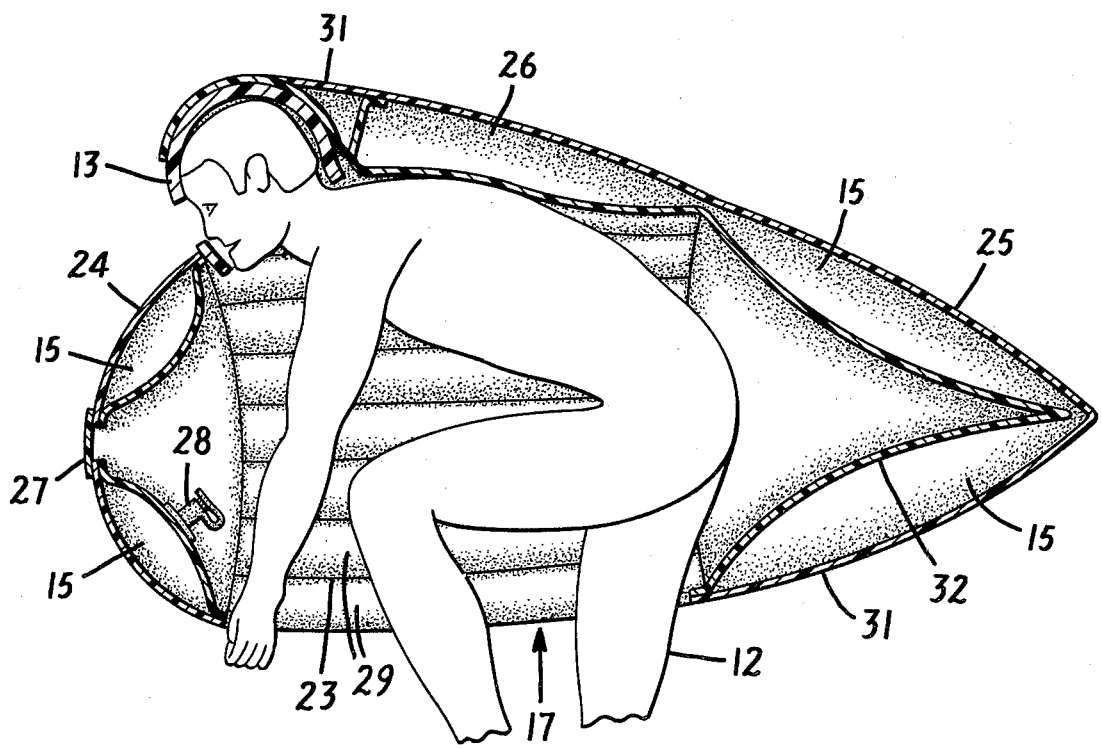
FIG. 3 is a sectional view taken along a view line corresponding to view line 3—3 of FIG. 2 and illustrating a modification of the embodiment of FIG. 2.

FIG. 3, a longitudinal sectional view of the bag 14, modified with regard to the helmet 13, as discussed hereinafter, shows the location of various air chambers or cells 15, 26 and 29. All of the air chambers 15, 26 and 29 are formed by the volumes enclosed by bonding the external skin 31 and internal skin 32 of the bag 14 along seams 23, as shown in detail in FIG. 6. The seams 23 also hold the sides of the bag 14 in a relatively flat plane. An adhesive or cement may be used to bond the skins 31 and 32 together or heat and pressure may be applied for bonding, if the skins are fabricated of thermoplastic materials. The seams 23 may also be sewn, as required, for greater strength.

Figure 4:
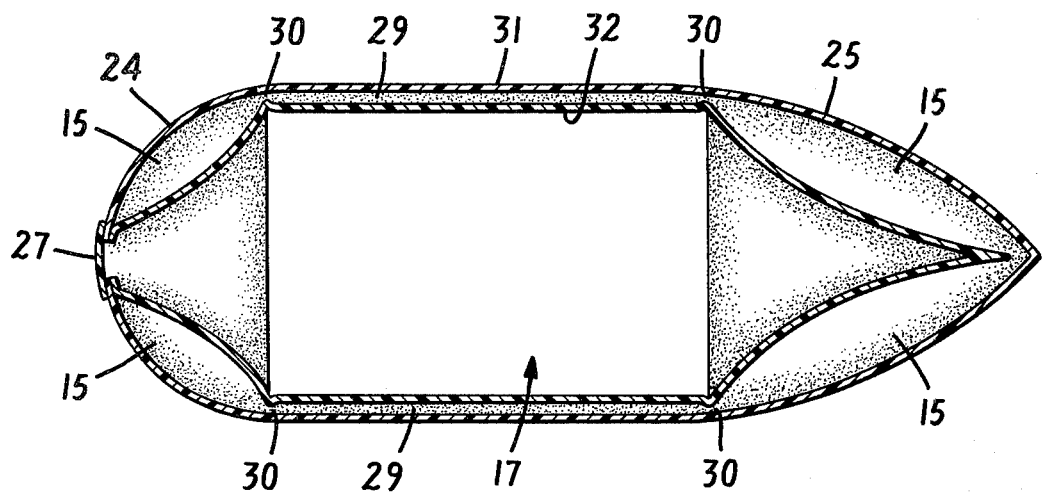
FIG. 4 is a sectional view taken along view line 4—4 of FIG. 1.
Figure 5:
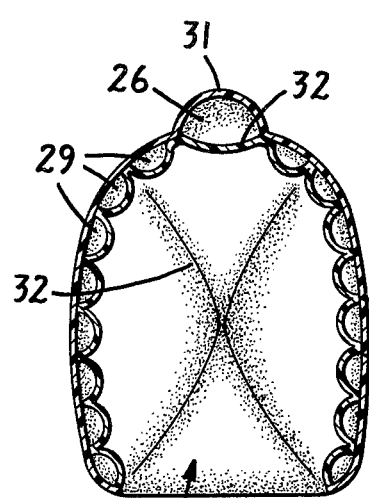
FIG. 5 is a sectional view taken along view line 5—5 of FIG. 1.
Figure 7:
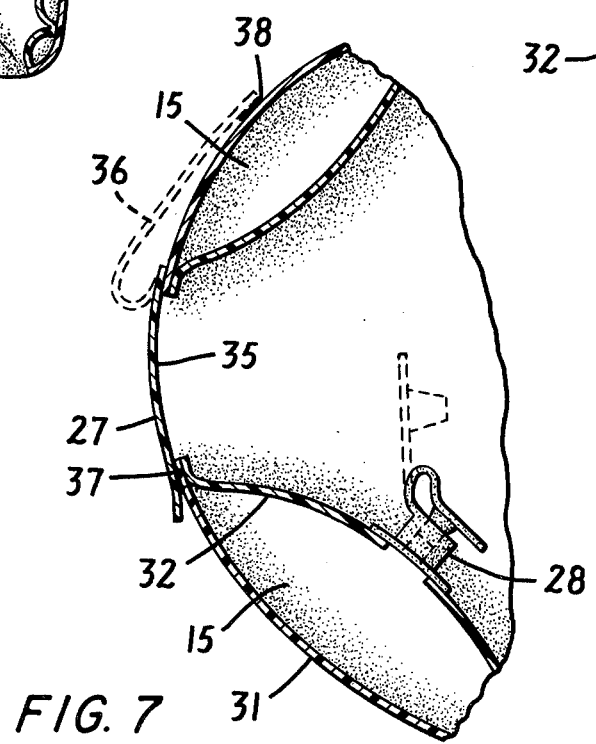
FIG. 7 is a view on an enlarged scale of a portion of the cross-section shown in FIG. 3.

A multiplicity of air chambers 29 extend along the sides of the bag 14, while the front 24 and the rear 25 of the bag 14 are held in shape by relatively fewer, but larger air chambers 15. A minimum of two or a maximum of four chambers 15, evenly distributed around the center plane, are recommended for either end. A headrest air chamber 26 is shaped so as to provide a fairing to the rear of the helmet 13. As shown in FIG. 7, a conventional air-sealing valve 28 is bonded to the internal skin 32 adjacent the front of the enclosure. The valve 28 allows the air chambers 15, 26 and 29 of the bag 14 to be inflated by means of lung power, a hand-operated pump, or compressed air. FIGS. 4 and 5 show the general location, size, and shape of the front and rear air chambers 15 and the longitudinal air chambers 29. The figures also show the location and shape of the bottom entry opening 17. As can be seen, air can pass freely between all air chambers 15, 26 and 29 through connecting passages, generally designated 30.

The air chambers 15, 26 and 29 are arranged so as to protect the rider 12 during accidental impacts, as in a fall or collision. For additional protection of the rider, the material of the bag 14 is tear and abrasion resistant. To provide a more regulated collapse of the bag 14 upon impact and to prevent excessive rebounding, the inflation valve 28 is calibrated to pop open under high pressures and provide a controlled leakage. Other pressure relief valves may also be installed to improve this performance.

Figure 6:
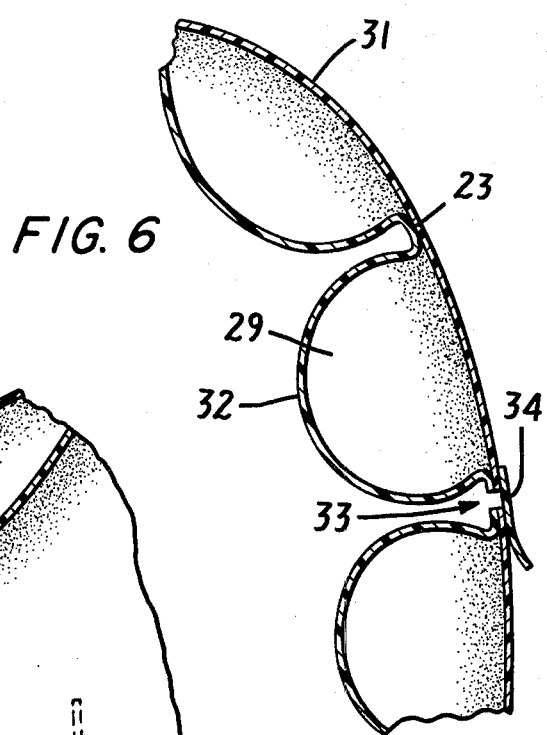
FIG. 6 is a view on an enlarged scale of a portion of the cross-section shown in FIG. 5.

FIG. 6 shows a lateral signalling or access opening 33 between two side air chambers 29. The entry of rain or air is prevented by a vent flap 34 bonded along one side to the external skin 31 adjacent the upper edge of the opening 33. The length of the opening 33 is just sufficient to allow a hand or arm to be extended laterally as the air chambers 29 are deformed. FIG. 7 shows in detail a front air vent flap 27 located between the separate upper and lower front air chambers 15 and bonded at its upper edge to the external skin 31. The flap 27 is held in a closed position 35 or an open position 36 (shown in phantom) by pressure fasteners 37 and 38.

To prevent rain, splashed water or cold air from entering the bag 14, deflectors or shields may be fitted to the openings in the bag. The helmet opening 22 may be covered by a clear plastic shield, similar to conventional shields already available for helmets, and the entry or access opening 17 may be fitted with a flexible plastic deflector at its leading edge. For warm weather use, deflectors may be provided at the entry opening 17 so as to direct cool air up toward the rider's body.

The flexible plastic material of the bag 14 may be translucent or it may be of a bright color which will make it more apparent to motorists. The material may also have a highly reflective silvered surface so as to reflect the sun's rays and keep the rider cooler. Of course, the material may be airtight and is water-tight to protect the rider.

An alternate manner of fitting the bag 14 to the helmet 13 is shown in FIG. 3. Instead of inserting the helmet through the opening outlined by the seam 21 and fastening the bag 14 and helmet 13 together, the external and internal skins 31 and 32 can be formed into a spherically shaped helmet shell or socket. The socket allows the rider's head in his helmet 13 to gimbal freely to either side or vertically, so as to provide a better field of vision. To allow low-friction movement, the helmet is covered with a cloth-like material which will not stick to the plastic skin in the socket.

A prototype of the inventive enclosure was constructed by hand to test the invention. The shape of the enclosure was determined by the size and position of a rider in a racing position and by an empirically derived low-drag shape (i.e., no concave curves and a long, tapered tail). Also considered were the theories of low speed aerodynamic shapes and the effect of laminar or turbulent air flow on base drag and skin friction, above and below the critical Reynolds number.

A mold was constructed out of polyurethane foam-in-place rigid foam on a plywood profile center board. Only one side of the mold was formed, as the final flexible plastic skins could be turned inside-out to comprise the opposite side. The rough urethane shape was finished to a smooth and durable surface with a thin layer of casting plaster. Material for the skins was to be a flexible vinyl film of about 0.008 inch thickness. It was not immediately available, however, so ordinary vinyl seat cover material was used, although it was about twice the thickness of the preferred film. Since vinyl has a forming temperature of about 130° F., it was heated and drawn into compound shapes through the use of a handheld 1000-watt electric blower. The maximum area that could be heated evenly was limited to a few square feet, so a number of pieces were formed and assembled into complete sides.

All seams and joints were sealed with vinyl adhesive. Seams were overlapped one-half inch, and the adhesive injected evenly for an airtight seal through the use of a hypodermic syringe and No. 22 needle. To restrict the capillary action of the adhesive when laying long channel seams between the inner and outer skins, a one-half inch wide strip of vinyl was bonded to one side first, and the skins spaced apart with lengths of cord on either side of it. After all longitudinal channels were formed, the cords were pulled out.

In final assembly, the front and rear cells and the left and right halves were bonded together. The front cell inner wall was fitted with a sealable inflation valve taken from a piece of inflatable vinyl furniture. Finally, minor leaks were found by immersing the inflated structure in a bathtub, and sealed by injecting the adhesive through the skin with the hypodermic.

As can be seen from the above description, the present invention provides a convenient, lightweight, streamlined enclosure for a cyclist that also affords protection for the cyclist in the event of a collision. The inventive enclosure protects the cyclist from the direct flow of cold air and from the elements in general. Since the streamlined enclosure covers only the cyclist's body, it reduces air drag by promoting air flow both above and below the cyclist's body in addition to laterally around the body. When the enclosure is formed of a flexible, lightweight, plastic material, the enclosure will reduce the effort required to accelerate or climb grades and also be capable of being deflated and compressed into a relatively small volume, so as to enable the enclosure to be carried, for example, in a protective helmet used with the enclosure. When a protective helmet is used in conjunction with the enclosure, increased night-time visibility can be provided by mounting battery-operated headlight and tail lights on the helmet. The field of vision of the rider can be expanded rearwardly by mounting mirrors on lateral struts that are fixed to the helmet and extend outwardly in line with the rider's eyes.

It will be understood that the embodiment described above is merely exemplary and that persons skilled in the art may make many variations and modifications without departing from the spirit and scope of the invention. All such modifications and variations are intended to be within the scope of the invention as defined in the appended claims.

I claim:

1. A portable enclosure for the rider of a wheeled vehicle, such as a bicycle, the enclosure comprising:
   an outer skin of flexible material which is longer relative to the forward direction of vehicle movement than it is wide, is generally inverted U-shaped transverse thereto and has at least a bottom opening;
   at least one forward air cell underlying and connected to the skin at the forward end of the enclosure for providing a smooth, rounded forward end shape to the skin at the forward end of the enclosure, the forward air cell being forwardly spaced from the rider of the vehicle;
   side air cells underlying and connected to the skin at sides of the enclosure, the side air cells extending from a position proximate the at least one forward air cell along sides of the enclosure, at least one side air cell extending to the bottom opening into the skin for defining, in cooperation with the other air cells, a space within the enclosure in which the rider can insert at least his torso, the side air cells also providing a curved shape to the skin at the sides of the enclosure which is generally smoothly continuous with the rounded forward end shape provided by the at least one forward air cell;
   at least one top air cell underlying and connected to the skin at the top of the enclosure for holding the skin at the top of the enclosure in a curve which is generally smoothly continuous with both sides of the enclosure at least at a rearward portion thereof, at least the top air cell also extending into the space within the opening for engaging the rider in the space within the enclosure thereby to support the enclosure in the desired position only on the rider; and
   at least one rearward air cell underlying and connected to the skin at a rearward end of the enclosure and extending from a position proximate the side air cells and the top air cell for providing a curved, rearward end shape to the skin of the enclosure which is smoothly continuous with at least the curves of the skin at the adjacent top and sides of the enclosure, the rearward air cell being rearwardly spaced from the rider of the vehicle;
   whereby an elongated, continuously smooth, curved shape is provided to the skin of the enclosure for reducing the air resistance to forward movement of the vehicle and rider over that which they have without the enclosure about the rider.

2. A portable enclosure according to claim 1 and additionally comprising a closable valve member through the outer skin and adapted to be opened to introduce air into said cells, said valve member also being constructed to open in response to an air pressure within said cells greater than a predetermined air pressure to release the greater pressure from within said cells whereby greater pressure from collision of the enclosure with an object is released through the valve rather than rupturing said cells to preserve a cushioning effect of said cells.

3. A portable enclosure according to claim 1 having a head opening adjacent the top and front of said enclosure through which a rider whose torso is enclosed by the enclosure can protrude at least the upper portion of his head, said head opening being dimensioned so that edges of the head opening are adapted to fit closely a rigid protective helmet worn by the rider.

4. A portable enclosure according to claim 3, also comprising a rigid protective helmet disposed in said head opening and coupled to said skin of the enclosure.

5. A portable enclosure according to claim 1 wherein the outer skin and air cells are shaped and located so as to define adjacent the top and front of the enclosure, when said plurality of air cells are inflated, a socket adapted to receive a rigid protective helmet having a rounded outer surface and adapted to be worn by a rider, said socket being adapted to permit said helmet to slidably rotate therein.

6. A portable enclosure according to claim 1 having at least one vent positioned so as to direct a flow of air onto the body of a rider in the enclosure.

7. A method of reducing the air resistance to forward movement of a wheeled vehicle such as a bicycle and its rider, the method comprising:
   enclosing at least the torso of the rider in a space within an elongated outer skin of flexible material having a bottom opening to a space for admitting the rider's torso;
   rounding a forward end of the skin relative to the direction of forward vehicle movement with an air cell or portion thereof which is forwardly spaced from the rider within the skin for initiating smooth air flow along the skin during forward vehicle movement;
   rounding top and side portions of the skin which extend rearwardly of the forward end in curves generally smoothly continuous with the rounded forward end with further air cells for continuing the smooth air flow from the forward end along the top and side of the skin;
   separating the sides of the skin with cooperation between the further air cells and forward air cell or portion thereof for providing the space within the skin for the rider's torso;
   projecting at least the air cell at the top of the skin into the space within the skin for engaging the rider to support the skin in the desired position only on the rider; and
   rounding a rearward end of the skin in curves generally smoothly continuous with the sides and top of the skin with still another air cell for continuing the smooth air flow from the forward end of the skin and along the top and sides thereof to and beyond the rearward end of the skin.

* * * * *